United States Patent
Shibata

(10) Patent No.: US 10,615,636 B2
(45) Date of Patent: Apr. 7, 2020

(54) UNINTERRUPTIBLE POWER SUPPLY

(71) Applicant: TOSHIBA MITSUBISHI-ELECTRIC INDUSTRIAL SYSTEMS CORPORATION, Chuo-ku (JP)

(72) Inventor: Naoya Shibata, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 155 days.

(21) Appl. No.: 15/746,166

(22) PCT Filed: Jul. 24, 2015

(86) PCT No.: PCT/JP2015/071072
§ 371 (c)(1),
(2) Date: Jan. 19, 2018

(87) PCT Pub. No.: WO2017/017719
PCT Pub. Date: Feb. 2, 2017

(65) Prior Publication Data
US 2018/0212460 A1    Jul. 26, 2018

(51) Int. Cl.
*H02J 9/06*    (2006.01)
(52) U.S. Cl.
CPC .............. *H02J 9/061* (2013.01); *H02J 9/062* (2013.01)
(58) Field of Classification Search
CPC ... H02J 9/061; H02J 9/062; H02J 9/00; G06F 1/00
See application file for complete search history.

(56) References Cited

U.S. PATENT DOCUMENTS

2006/0290205 A1 * 12/2006 Heber ..................... H02J 9/062
307/65

FOREIGN PATENT DOCUMENTS

| JP | 57-75539 A | 5/1982 |
| JP | 284029 * | 1/1990 |
| JP | 2-84029 A | 3/1990 |
| JP | 284029 * | 3/1990 |
| JP | 3-164038 A | 7/1991 |
| JP | 2012-120407 A | 6/2012 |

OTHER PUBLICATIONS

Translation of JP-284029 (Year: 1990).*

(Continued)

*Primary Examiner* — Rexford N Barnie
*Assistant Examiner* — Elim Ortiz
(74) *Attorney, Agent, or Firm* — Oblon, McClelland, Maier & Neustadt, L.L.P.

(57) ABSTRACT

This uninterruptible power supply executes a counter voltage generation mode between a bypass power supply mode and a lap power supply mode. During the counter voltage generation mode, voltage feedforward control is performed for an inverter (2) in accordance with a detection value of a voltage detector (VD5) to generate a counter voltage at one terminal of a switch (S2), the counter voltage being at a level corresponding to a voltage at an output terminal (T4). Therefore, without providing an extra voltage detector for generation of counter voltage, an inrush current can be prevented from flowing from a bypass AC power source (52) to an AC filter (F2) through the switch (S2) when the switch (S2) is turned on.

3 Claims, 4 Drawing Sheets

(56) References Cited

OTHER PUBLICATIONS

Office Action dated Nov. 27, 2018 in Canadian Patent Application No. 2,991,877.
Office Action dated Jul. 24, 2018 in Japanese Patent Application No. 2017-530465 with unedited computer generated English translation.
International Search Report dated Sep. 15, 2015 in PCT/JP2015/071072 filed Jul. 24, 2015.

* cited by examiner

UNINTERRUPTIBLE POWER SUPPLY

TECHNICAL FIELD

The present invention relates to an uninterruptible power supply, and more particularly to an uninterruptible power supply that has a bypass power supply mode in which AC power from a bypass AC power source is supplied to a load and an inverter power supply mode in which AC power generated by an inverter is supplied to the load.

BACKGROUND ART

An uninterruptible power supply includes a converter for converting AC power from a commercial AC power source into DC power, an inverter for converting DC power into AC power, an AC filter for converting the waveform of an output voltage of the inverter into a sinusoidal wave, and first and second switches. One terminal of the first switch receives an AC voltage that has passed through the AC filter. One terminal of the second switch receives AC power from a bypass AC power source. The other terminal of the first switch and the other terminal of the second switch are both connected to a load.

During a bypass power supply mode, the first switch is OFF and the second switch is ON so that AC power from the bypass AC power source is supplied to the load through the second switch. During an inverter power supply mode, the first switch is ON and the second switch is OFF so that AC power generated by the inverter is supplied to the load through the AC filter and the first switch. At the time of change from the bypass power supply mode to the inverter power supply mode, the first and second switches are turned on so that AC power is supplied to the load from both the inverter and the bypass AC power source, and then the second switch is turned off (PTD 1: Japanese Patent Laying-Open No. 2012-120407).

CITATION LIST

Patent Document

PTD 1: Japanese Patent Laying-Open No. 2012-120407

SUMMARY OF INVENTION

Technical Problem

In such an uninterruptible power supply, for shifting from the bypass power supply mode to the inverter power supply mode, it is necessary to activate the inverter to generate a counter voltage at one terminal of the first switch before turning on the first switch. This is to prevent an inrush current from flowing from the bypass AC power source to a capacitor of the AC filter through the first switch when the first switch is turned on.

As a method of generating a counter voltage, there is a method with a first voltage detector for detecting an instantaneous value of a voltage at the terminal of a first switch on the load side, and a second voltage detector for detecting an instantaneous value of a voltage at the terminal of the first switch on the AC filter side, where an inverter is controlled so that a detection value of the second voltage detector agrees with a detection value of the first voltage detector (see FIG. 4). Such a method, however, disadvantageously requires a large number of voltage detectors, thus involving high cost.

Therefore, a main object of the present invention is to provide a low-cost uninterruptible power supply.

Solution to Problem

An uninterruptible power supply according to the present invention includes: a first terminal configured to receive AC power supplied from a commercial AC power source; a second terminal configured to receive AC power supplied from a bypass AC power source; a third terminal to be connected to a load; a converter configured to convert AC power supplied from the commercial AC power source through the first terminal into DC power; an inverter configured to convert DC power generated by the converter or DC power in a power storage device into AC power; an AC filter configured to convert the waveform of an output voltage of the inverter into a sinusoidal wave; a first switch having one terminal configured to receive an AC voltage that has passed through the AC filter, and having the other terminal connected to the third terminal; a second switch connected between the second terminal and the third terminal; a first voltage detector configured to detect an instantaneous value of a voltage at the third terminal; and a controller configured to control the inverter based on a detection value of the first voltage detector. The controller successively executes: a first mode in which the first switch is OFF and the second switch is ON to supply AC power from the bypass AC power source to the load; a second mode in which voltage feedforward control is performed for the inverter in accordance with the detection value of the first voltage detector to generate a counter voltage at the one terminal of the first switch, the counter voltage being at a level corresponding to the voltage at the third terminal; a third mode in which the first switch is ON to supply AC power to the load from both the inverter and the bypass AC power source and in which an output current of the inverter is increased to a load current; and a fourth mode in which the second switch is OFF to supply AC power generated by the inverter to the load.

Advantageous Effects of Invention

In an uninterruptible power supply according to the present invention, a second mode is executed between a first mode and a third mode. In the second mode, voltage feedforward control is performed for an inverter in accordance with a detection value of a first voltage detector to generate a counter voltage at one terminal of a first switch, the counter voltage being at a level corresponding to a voltage at a third terminal. Therefore, when the first switch is turned on at the third mode, an inrush current can be prevented from flowing from a bypass AC power source to an AC filter through the first switch. In addition, there is no need to provide an extra voltage detector for generation of counter voltage, thus leading to reduction in cost.

DESCRIPTION OF EMBODIMENTS

Figure 1:
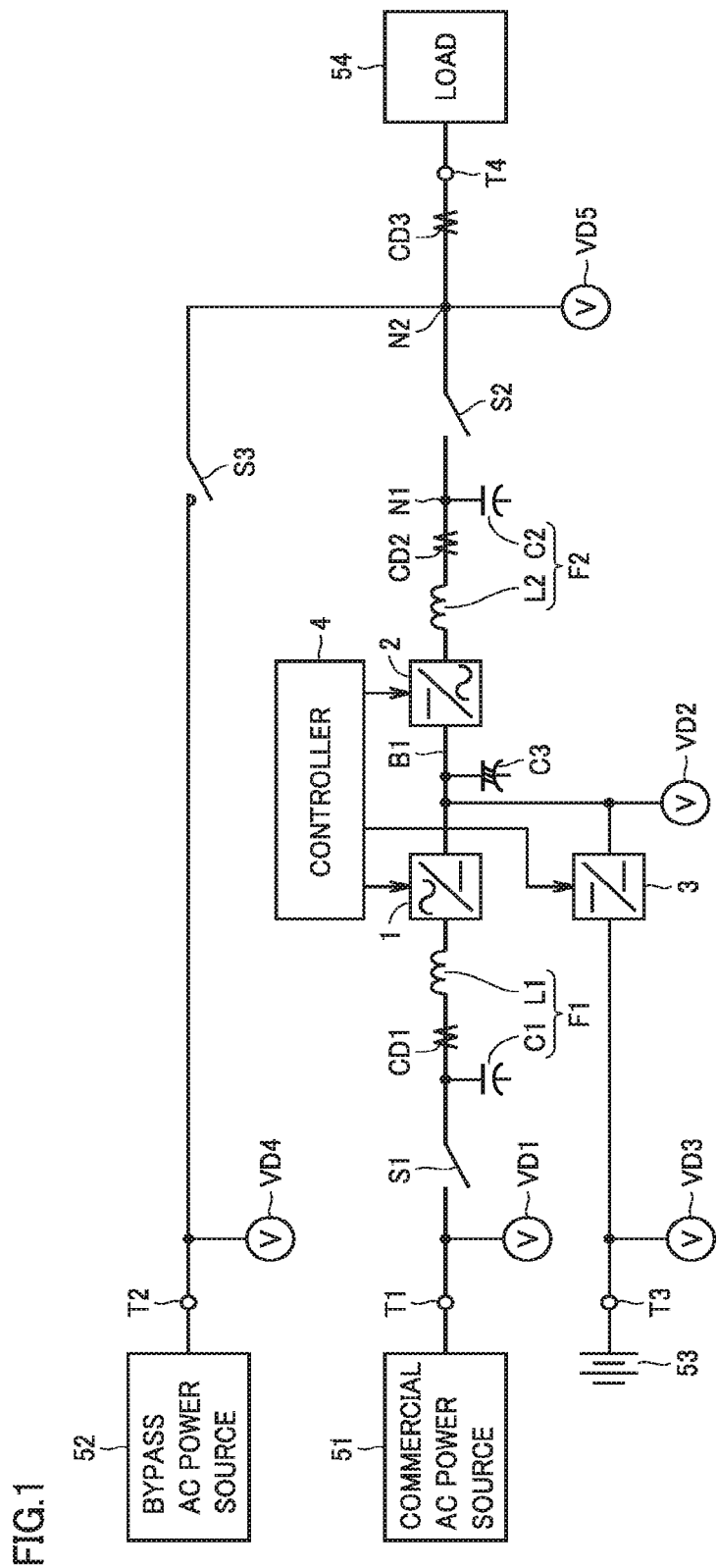
FIG. 1 is a circuit block diagram showing a configuration of an uninterruptible power supply according one embodiment of the present invention.

FIG. 1 is a circuit block diagram showing a configuration of an uninterruptible power supply according one embodiment of the present invention. Although the uninterruptible power supply receives three-phase AC power and outputs three-phase AC power, FIG. 1 shows only a part responsible for single-phase AC power for simplicity of the drawing and the explanation.

In FIG. 1, the uninterruptible power supply includes an AC input terminal T1, a bypass terminal T2, a battery terminal T3, and an output terminal T4. AC input terminal T1 receives AC power having a commercial frequency supplied from a commercial AC power source 51. Bypass terminal T2 receives AC power having a commercial frequency supplied from a bypass AC power source 52. Bypass AC power source 52 may be the same as commercial AC power source 51 and may be, for example, a non-utility power generator.

Battery terminal T3 is to be connected to a battery 53 (power storage device). Battery 53 stores DC power. A capacitor may be connected instead of battery 53. Output terminal T4 is to be connected to a load 54. Load 54 is driven with AC power having a commercial frequency supplied from the uninterruptible power supply.

The uninterruptible power supply further includes switches S1-S3, capacitors C1-C3, reactors L1, L2, a converter 1, a DC bus B1, an inverter 2, a bidirectional chopper 3, voltage detectors VD1-VD5, current detectors CD1-CD3, and a controller 4.

Switch S1 has one terminal connected to AC input terminal T1 and has the other terminal connected to an input node of converter 1 through reactor L1. Capacitor C1 is connected to the other terminal of switch S1. An output node of converter 1 is connected to an input node of inverter 2 through DC bus B1, and is connected to battery terminal T3 through bidirectional chopper 3. Capacitor C3 is connected to DC bus B1.

An output node of inverter 2 is connected to one terminal of switch S2 through reactor L2 and a node N1, and the other terminal of switch S2 is connected to output terminal T4 through a node N2. Capacitor C2 is connected to node N1. Switch S3 has one terminal connected to bypass terminal T2 and has the other terminal connected to node N2.

Switch S1 is controlled by controller 4. Switch S1 is ON during a normal time when AC power is supplied from commercial AC power source 51, and is OFF during a power failure time when supply of AC power from commercial AC power source 51 is stopped.

Capacitor C1 and reactor L1 constitute an AC filter F1. AC filter F1 is a low-pass filter which allows passage of AC power having a commercial frequency supplied from commercial AC power source 51 and interrupts a signal having a switching frequency generated in converter 1.

Converter 1 is controlled by controller 4. During a normal time when AC power is supplied from commercial AC power source 51, converter 1 converts AC power from commercial AC power source 51 into DC power and provides the DC power to inverter 2 and bidirectional chopper 3 through DC bus B1. During a power failure time when supply of AC power from commercial AC power source 51 is stopped, the operation of converter 1 is stopped. Capacitor C3 smoothes and stabilizes a DC voltage at DC bus B1.

Bidirectional chopper 3 is controlled by controller 4. During a normal time, bidirectional chopper 3 stores DC power generated by converter 1 in battery 53. During a power failure time, bidirectional chopper 3 supplies DC power from battery 53 to inverter 2.

Inverter 2 is controlled by controller 4. During a normal time, inverter 2 converts DC power generated by converter 1 into AC power having a commercial frequency. During a power failure time, inverter 2 converts DC power supplied from battery 53 through bidirectional chopper 3 into AC power having a commercial frequency.

Reactor L2 and capacitor C2 constitute an AC filter F2. AC filter F2 is a low-pass filter which allows passage of AC power having a commercial frequency generated by inverter 2 and interrupts a signal having a switching frequency generated in inverter 2. In other words, AC filter F2 converts the waveform of an output voltage of inverter 2 into a sinusoidal wave.

Switch S2 (first switch) is controlled by controller 4. Switch S2 is OFF during a bypass power supply mode and during a counter voltage generation mode, and is ON during a lap power supply mode and during an inverter power supply mode. The bypass power supply mode (first mode) is a mode in which AC power from bypass AC power source 52 is supplied to load 54. The inverter power supply mode (fourth mode) is a mode in which AC power generated by inverter 2 is supplied to load 54.

The lap power supply mode (third mode) is a mode in which AC power from bypass AC power source 52 and AC power generated by inverter 2 are both supplied to load 54 at the time of change from the bypass power supply mode to the inverter power supply mode.

The counter voltage generation mode (second mode) is a mode before switch S2 is turned on at the lap power supply mode and in which a counter voltage is generated at node N1, the counter voltage being at a level corresponding to a voltage at node N2 (i.e., a voltage at output terminal T4). Although it is preferable that a level of counter voltage and a voltage at output terminal T4 agree with each other, a little difference between them is allowable.

Switch S3 (second switch) is controlled by controller 4. Switch S3 is ON during the bypass power supply mode, during the counter voltage generation mode, and during the lap power supply mode. Switch S3 is OFF during the inverter power supply mode.

Voltage detector VD1 detects an instantaneous value of an AC voltage at AC input terminal T1 (i.e., an AC voltage supplied from commercial AC power source 51) and provides a signal representing the detection value to controller 4. Controller 4 determines whether AC power is normally supplied from commercial AC power source 51 (i.e., whether a power failure has occurred), based on an output signal from voltage detector VD1.

Current detector CD1 detects an instantaneous value of an AC current flowing at reactor L1 (i.e., an input current of converter 1) and provides a signal representing the detection value to controller 4. Voltage detector VD2 detects an instantaneous value of a DC voltage at DC bus B1 and provides a signal representing the detection value to controller 4.

Controller 4 controls converter 1 based on output signals from voltage detectors VD1, VD2 and current detector CD1. In other words, during a normal time, converter 1 supplies DC power to DC bus B1 (i.e., to inverter 2 and bidirectional chopper 3) so that a DC voltage at DC bus B1 becomes a predetermined target DC voltage. During a power failure time, the operation of converter 1 is stopped.

Voltage detector VD3 detects an instantaneous value of a DC voltage at battery terminal T3 (i.e., an inter-terminal voltage of battery 53) and provides a signal representing the detection value to controller 4. Controller 4 controls bidirectional chopper 3 based on output signals from voltage detectors VD3, VD4. In other words, during a normal time, bidirectional chopper 3 supplies DC power to battery 53 so that a DC voltage at battery terminal T3 becomes a predetermined target battery voltage, and during a power failure time, bidirectional chopper 3 supplies DC power to DC bus B1 (i.e., to inverter 2) so that a DC voltage at DC bus B1 becomes a predetermined target DC voltage.

Voltage detector VD4 detects an instantaneous value of an AC voltage at bypass terminal T2 (i.e., an AC voltage supplied from bypass AC power source 52) and provides a signal representing the detection value to controller 4. Voltage detector VD5 detects an instantaneous value of an AC voltage at node N2 (i.e., an AC voltage at output terminal T4) and provides a signal representing the detection value to controller 4.

Current detector CD2 detects an instantaneous value of an AC current flowing at reactor L2 (i.e., an output current of inverter 2) and provides a signal representing the detection value to controller 4. Current detector CD3 detects an instantaneous value of an AC current flowing from node N2 to output terminal T4 (i.e., a load current) and provides a signal representing the detection value to controller 4. Controller 4 controls inverter 2 based on output signals from voltage detectors VD4, VD5 and current detectors CD2, CD3.

Specifically, during the inverter power supply mode, controller 4 generates a voltage instruction value based on a detection value of voltage detector VD4 (i.e., an AC voltage supplied from bypass AC power source 52), performs voltage feedback control for inverter 2 so that a detection value of voltage detector VD5 (i.e., an AC voltage at output terminal T4) agrees with the voltage instruction value, and performs current feedforward control for inverter 2 so that inverter 2 supplies a detection value of current detector CD3 (i.e., a load current).

At the time of change from the bypass power supply mode to the inverter power supply mode, controller 4 successively executes the counter voltage generation mode and the lap power supply mode. During the counter voltage generation mode, controller 4 performs voltage feedforward control for inverter 2 in accordance with a detection value of voltage detector VD5 (i.e., an AC voltage output from bypass AC power source 52 to output terminal T4) and performs current feedback control for inverter 2 so that a detection value of current detector CD2 (i.e., a current flowing from inverter 2 to capacitor C2 through reactor L2) agrees with a current instruction value. Thus, a voltage at node N1 (a counter voltage) becomes equal to a voltage at output terminal T4. Accordingly, an inrush current is prevented from flowing from bypass AC power source 52 to capacitor C2 through switches S3, S2 when switch S2 is turned on.

During the lap power supply mode, controller 4 makes switch S2 ON so that AC power is supplied to load 54 from both inverter 2 and bypass AC power source 52. Further, controller 4 performs current feedforward control for inverter 2 in accordance with a detection value of current detector CD3 to gradually increase an output current of inverter 2 and supply a load current from inverter 2. Controller 4 then turns off switch S3 and executes the inverter power supply mode.

Figure 2:
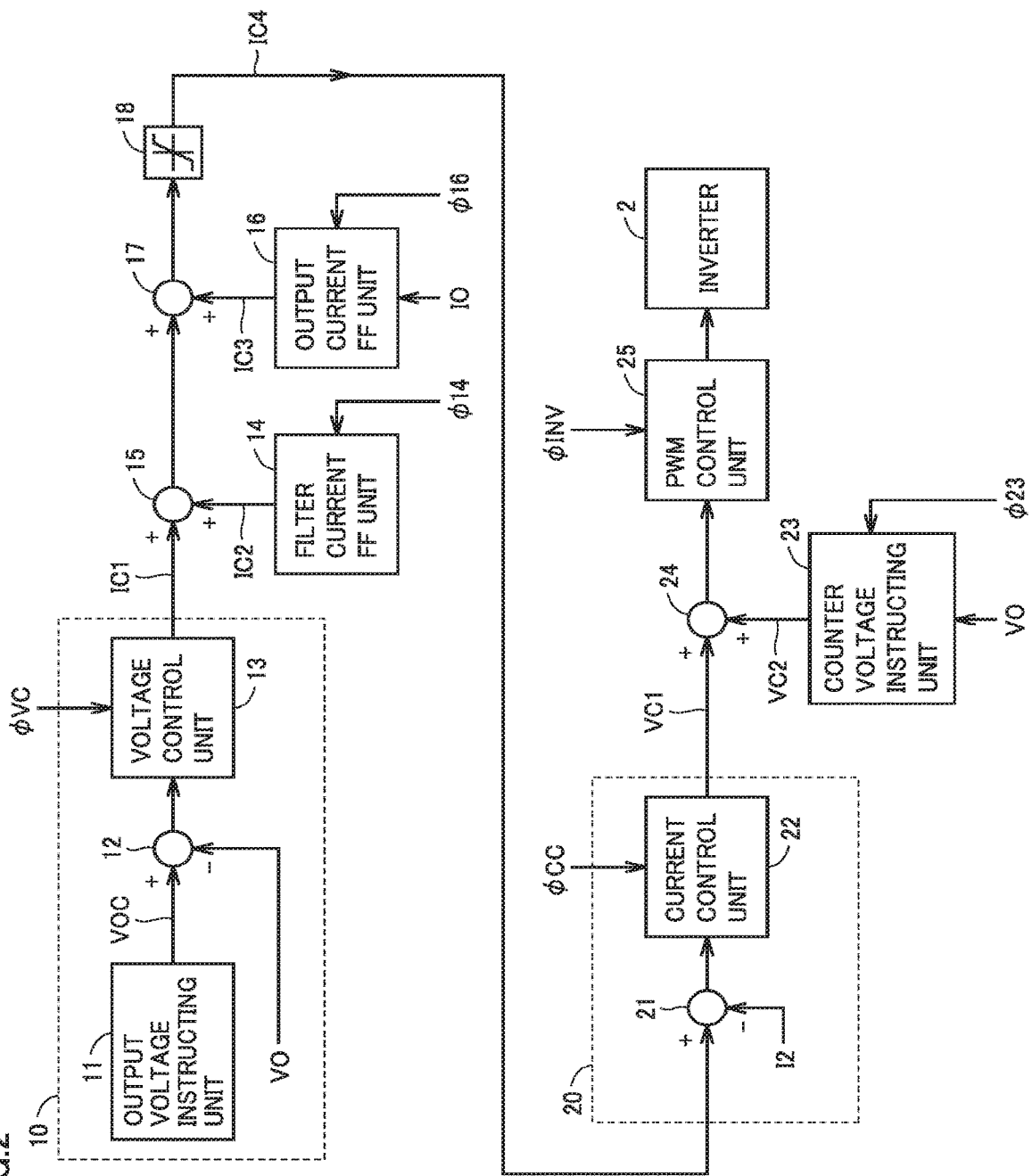
FIG. 2 is a block diagram showing a configuration of a part of a controller shown in FIG. 1 that is responsible for control for an inverter.
Figure 3:
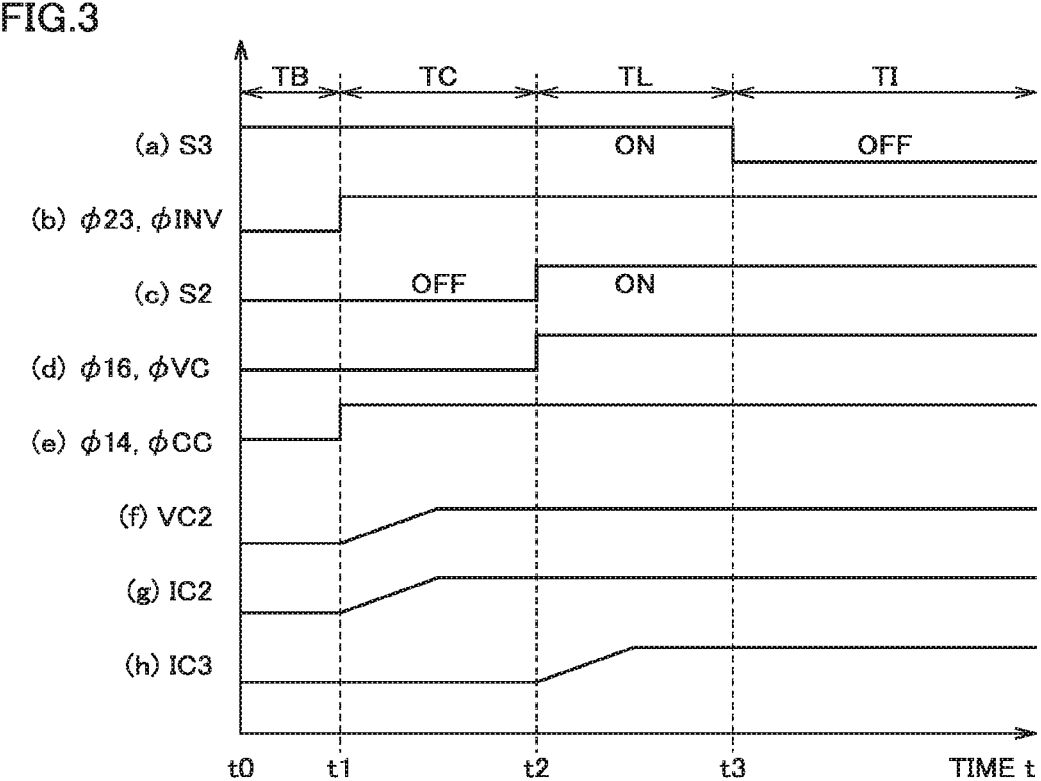
FIG. 3 is a time chart showing the behavior of the part shown in FIG. 2 of the controller shown in FIG. 1.

FIG. 2 is a block diagram showing a configuration of a part of controller 4 that is responsible for control for inverter 2. FIG. 3 (a)-(h) is a time chart showing the behavior of the part shown in FIG. 2 of controller 4. FIG. 3 (a)-(h) shows a state in which the bypass power supply mode (time t0-t1), the counter voltage generation mode (time t1-t2), the lap power supply mode (time t2-t3), and the inverter power supply mode (after time t3) are successively executed.

As shown in FIG. 2, controller 4 includes a voltage feedback control unit 10, a filter current feedforward (FF) unit 14, adders 15, 17, 24, an output current feedforward (FF) unit 16, a current limiter 18, a current feedback control unit 20, a counter voltage instructing unit 23, and a pulse width modulation (PWM) control unit 25.

Voltage feedback control unit 10 includes an output voltage instructing unit 11, a subtractor 12, and a voltage control unit 13. Output voltage instructing unit 11 generates an output voltage instruction value VOC based on a detection value of voltage detector VD4. Output voltage instruction value VOC sinusoidally varies in the same phase and with the same voltage as an AC voltage supplied from bypass AC power source 52. Subtractor 12 subtracts an output voltage detection value VO (a detection value of voltage detector VD5) from output voltage instruction value VOC and acquires the deviation of VO from VOC.

When a control signal ϕVC is at the "H" level in active level, voltage control unit 13 is activated and outputs a current instruction value IC1 so that the deviation of VO from VOC is 0. When control signal ϕVC is at the "L" level in inactive level, voltage control unit 13 is inactivated and sets current instruction value IC1 to 0.

As shown in FIG. 3 (d), a control signal VC is at the "L" level during bypass power supply mode TB and during counter voltage generation mode TC, and is at the "H" level during lap power supply mode TL and during inverter power supply mode TI. Subtractor 12 and voltage control unit 13 constitute, for example, a proportional-integral-derivative (PID) control unit.

As shown in FIG. 3 (e), (g), in response to a control signal ϕ14 transitioning from the "L" level in inactive level to the "H" level in active level, filter current feedforward unit 14 gradually increases a current instruction value IC2 from 0 to a predetermined value. When control signal ϕVC is at the "L" level in inactive level, filter current feedforward unit 14 is inactivated and sets current instruction value IC2 to 0.

As shown in FIG. 3 (e), control signal ϕ14 is at the "L" level during bypass power supply mode TB, and is at the "H" level during counter voltage generation mode TC, during lap power supply mode TL, and during inverter power supply mode TI. Adder 15 adds current instruction value IC1 generated by voltage control unit 13 and current instruction value IC2 generated by filter current feedforward unit 14.

As shown in FIG. 3 (d), (h), in response to a control signal ϕ16 transitioning from the "L" level in inactive level to the "H" level in active level, output current feedforward unit 16 gradually increases a current instruction value IC3 from 0 to a detection value IO of current detector CD3.

As shown in FIG. 3 (d), control signal ϕ16 is at the "L" level during bypass power supply mode TB and during counter voltage generation mode TC, and is at the "H" level during lap power supply mode TL and during inverter power supply mode TI.

Adder 17 adds current instruction value IC3 generated by output current feedforward unit 16 to an output value of adder 15. Current limiter 18 generates a current instruction value IC4 by limiting an output value of adder 17 to within a predetermined range.

Current feedback control unit 20 includes a subtractor 21 and a current control unit 22. Subtractor 21 subtracts a detection value I2 of current detector CD2 from current instruction value IC4 generated by current limiter 18 and acquires the deviation of I2 from IC4.

When a control signal φCC is at the "H" level in active level, current control unit 22 is activated and outputs a voltage instruction value VC1 so that the deviation of I2 from IC4 is 0. When control signal φCC is at the "L" level in inactive level, current control unit 22 is inactivated and sets voltage instruction value VC1 to 0.

As shown in FIG. 3 (e), control signal φCC is at the "L" level during bypass power supply mode TB, and is at the "H" level during counter voltage generation mode TC, during lap power supply mode TL, and during inverter power supply mode TI. Subtractor 21 and current control unit 22 constitute, for example, a PID control unit.

As shown in FIG. 3 (b), (f), in response to a control signal φ23 transitioning from the "L" level in inactive level to the "H" level in active level, counter voltage instructing unit 23 gradually increases a voltage instruction value VC2 from 0 to detection value IO of voltage detector VD5.

As shown in FIG. 3 (b), control signal φ23 is at the "L" level during bypass power supply mode TB, and is at the "H" level during counter voltage generation mode TC, during lap power supply mode TL, and during inverter power supply mode TI. Adder 24 adds voltage instruction value VC1 generated by current control unit 22 and voltage instruction value VC2 generated by counter voltage instructing unit 23.

When a control signal φINV is at the "H" level in active level, PWM control unit 25 is activated to generate a PWM signal based on an output value of adder 24 and to control inverter 2 with the PWM signal.

As shown in FIG. 3 (b), control signal φINV is at the "L" level during the bypass power supply mode, and is at the "H" level during counter voltage generation mode TC, during lap power supply mode TL, and during inverter power supply mode TI.

Next, the behavior of this uninterruptible power supply is described with reference to FIG. 3 (a)-(h). During bypass power supply mode TB (time t0-t1), switch S3 is ON and switch S2 is OFF so that AC power is supplied from bypass AC power source 52 to load 54 through switch S3. Control signals φ23, φINV, φ16, φVC, φ14, φCC are all at the "L" level in inactive level, and voltage instruction value VC2 and current instruction values IC2, IC3 are all set to 0.

When a shift from the bypass power supply mode to the inverter power supply mode is instructed, the mode is shifted from the bypass power supply mode to the inverter power supply mode through the counter voltage generation mode and the lap power supply mode.

During counter voltage generation mode TC (time t1-t2), control signals φ23, φINV, φ14, φCC are at the "H" level in active level, and counter voltage instructing unit 23, PWM control unit 25, filter current feedforward unit 14, and current control unit 22 are activated. Voltage instruction value VC2 is gradually increased by counter voltage instructing unit 23, and current instruction value IC2 is gradually increased by filter current feedforward unit 14.

When voltage instruction value VC2 and current instruction value IC2 gradually increase, PWM control unit 25 causes a soft start of inverter 2, thereby causing gradual increases in output voltage and output current of inverter 2. The output current of inverter 2 is detected by current detector CD2, and the detection value I2 is fed back to current feedback control unit 20. Thus, current feedback control is performed for inverter 2 so that detection value I2 of current detector CD2 agrees with current instruction value IC2, and voltage feedforward control is performed for inverter 2 in accordance with voltage instruction value VC2. Accordingly, voltages at the both terminals of switch S2 (i.e., voltages at nodes N1, N2) agree with each other.

During lap power supply mode TL (time t2-t3), control signals φ16, φVC are at the "H" level to activate output current feedforward unit 16 and voltage control unit 13, and switch S2 is ON. Since voltages at the both terminals of switch S2 have agreed with each other in counter voltage generation mode TC, an inrush current does not flow from bypass AC power source 52 to capacitor C2 of AC filter F2 when switch S2 is turned on.

Current instruction value IC3 is gradually increased by output current feedforward unit 16. An output current of inverter 2 is detected by current detector CD2, and the detection value I2 is fed back to current feedback control unit 20. When current instruction value IC3 gradually increases, PWM control unit 25 causes a soft start of inverter 2, thereby causing a gradual increase in output current of inverter 2. An output current of inverter 2 is increased until a load current is supplied entirely from inverter 2.

During inverter power supply mode TI (after time t3), switch S3 is OFF and bypass AC power source 52 and load 54 are electrically disconnected from each other. During a normal time when AC power is supplied from commercial AC power source 51, AC power from commercial AC power source 51 is converted into DC power by converter 1. The DC power is stored in battery 53 by bidirectional chopper 3 and is also converted into AC power by inverter 2 to be supplied to load 54. At this time, voltage feedback control is performed for inverter 2 so that a detection value of current detector VD5 agrees with a voltage instruction value, and current feedforward control is performed for inverter 2 so that inverter 2 supplies a current (a load current) of a detection value of current detector CD3.

During a power failure, the operation of converter 1 is stopped and switch S1 is OFF. Thus, DC power in battery 53 is supplied to inverter 2 through bidirectional chopper 3, and the DC power is converted into AC power to be supplied to load 54. Therefore, the operation of load 54 can be continued as long as DC power is stored in battery 53.

During maintenance of the uninterruptible power supply, switches S1, S2 are OFF and switch S3 is ON. Thus, the operation of converter 1, inverter 2, and bidirectional chopper 3 is stopped. AC power is supplied from bypass AC power source 52 to load 54 through switch S3, and load 54 is operated.

Figure 4:
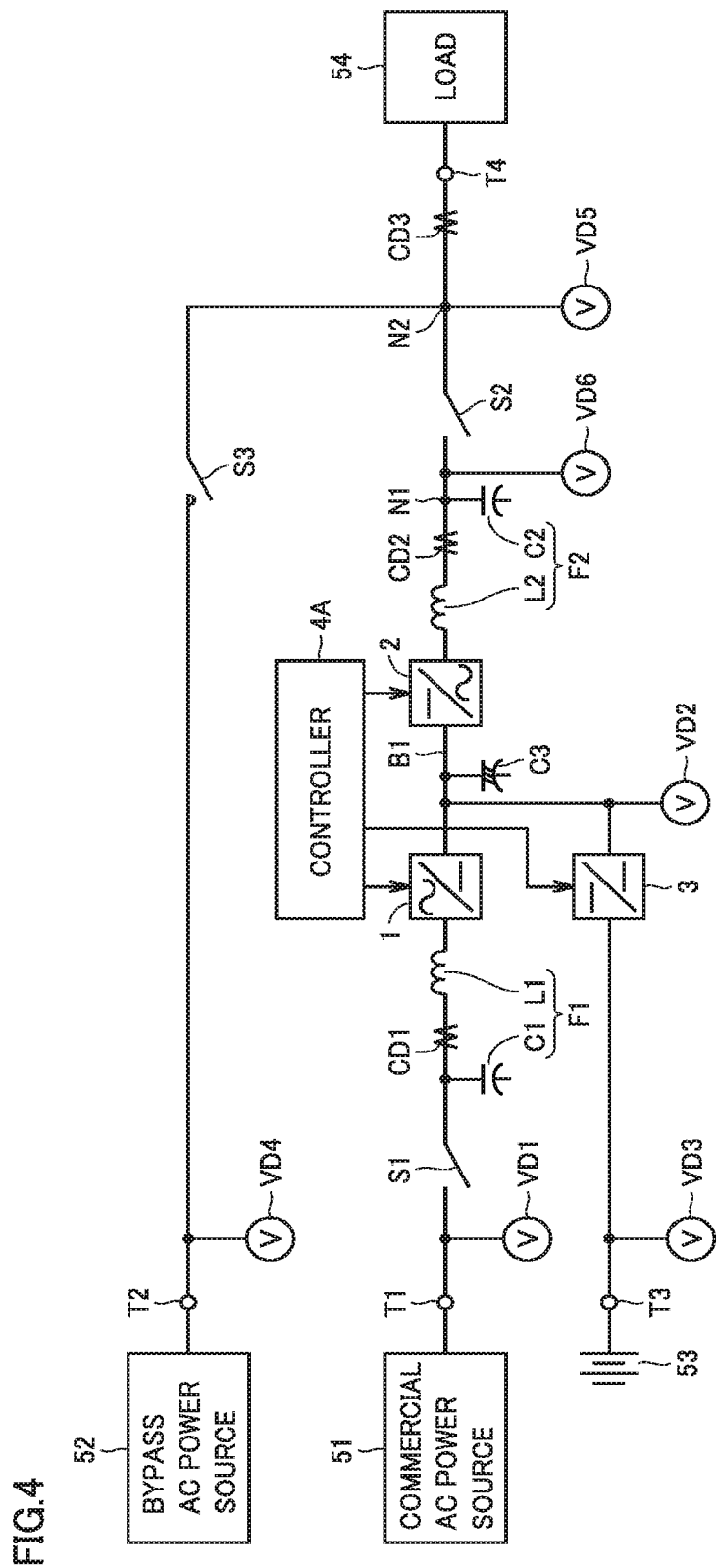
FIG. 4 is a circuit block diagram showing a comparison example with respect to the embodiment.

FIG. 4 is a circuit block diagram showing a comparison example with respect to the present embodiment, FIG. 4 being contrasted with FIG. 1. With reference to FIG. 4, this uninterruptible power supply is different from the uninterruptible power supply in FIG. 1 in that the former additionally includes a voltage detector VD6 and includes a controller 4A instead of controller 4. Voltage detector VD6 detects a voltage at node N1 and outputs a signal representing the detection value to controller 4A. During the counter voltage generation mode, controller 4A controls inverter 2 so that a detection value of voltage detector VD6 agrees with a detection value of voltage detector VD5. This comparison example requires a larger number of voltage detectors than the uninterruptible power supply in FIG. 1, thus involving high cost.

As described above, in the present embodiment, the counter voltage generation mode is executed between the bypass power supply mode and the lap power supply mode.

Feedforward control is performed for inverter 2 in accordance with a detection value of voltage detector VD5 to generate a counter voltage and equalize voltages at the both terminals of switch S2, and then switch S2 is turned on. Therefore, when switch S2 is turned on, an inrush current can be prevented from flowing from bypass AC power source 52 to capacitor C2 of AC filter F2 through switch S2. In addition, since there is no need to provide extra voltage detector VD6 for generation of counter voltage as in the comparison example, reduction in cost can be achieved.

The embodiment disclosed here should be considered illustrative in all respects, not limitative. It is intended that the scope of the present invention is defined not by the above description but by the claims, and that the scope of the invention includes all the modifications in the meaning and scope equivalent to the claims.

REFERENCE SIGNS LIST

T1: AC input terminal; T2: bypass terminal; T3: battery terminal; T4: output terminal; S1-S3: switch; C1-C3: capacitor; L1, L2: reactor; 1: converter; B1: DC bus; 2: inverter; 3: bidirectional chopper; VD1-VD6: voltage detector; CD1-CD3: current detector; 4, 4A: controller; 10: voltage feedback control unit; 11: output voltage instructing unit; 12, 21: subtractor; 13: voltage control unit; 14: filter current feedforward unit; 15, 17, 24: adder; 16: output current feedforward unit; 18: current limiter; 20: current feedback control unit; 22: current control unit; 23: counter voltage instructing unit; 25: PWM control unit; 51: commercial AC power source; 52: bypass AC power source; 53: battery; 54: load

The invention claimed is:

1. An uninterruptible power supply comprising:
a first terminal configured to receive AC power supplied from a commercial AC power source;
a second terminal configured to receive AC power supplied from a bypass AC power source;
a third terminal to be connected to a load;
a converter configured to convert AC power supplied from the commercial AC power source through the first terminal into DC power;
an inverter configured to convert DC power generated by the converter or DC power in a power storage device into AC power;
an AC filter configured to convert a waveform of an output voltage of the inverter into a sinusoidal wave;
a first switch having one terminal configured to receive an AC voltage that has passed through the AC filter, and having the other terminal connected to the third terminal;
a second switch connected between the second terminal and the third terminal;
a first voltage detector configured to detect an instantaneous value of a voltage at the third terminal;
a controller configured to control the inverter based on a detection value of the first voltage detector;
a first current detector configured to detect an instantaneous value of the output current of the inverter; and
a second current detector configured to detect the load current flowing at the third terminal,
wherein the controller is configured to:
execute a first mode in which the first switch is OFF and the second switch is ON to supply AC power from the bypass AC power source to the load;
execute a second mode in which voltage feedforward control is performed for the inverter in accordance with the detection value of the first voltage detector to generate a counter voltage at the one terminal of the first switch, the counter voltage being at a level corresponding to the voltage at the third terminal;
execute a third mode in which the first switch is ON to supply AC power to the load from both the inverter and the bypass AC power source and in which an output current of the inverter is increased to a load current;
execute a fourth mode in which the second switch is OFF to supply AC power generated by the inverter to the load;
shift from the first mode to the second mode in response to an instruction for shifting from the first mode to the fourth mode;
during the second mode, perform voltage feedforward control for the inverter so as to gradually increase the counter voltage to the detection value of the first voltage detector, perform current feedback control for the inverter so that a detection value of the instantaneous value detected by the first current detector agrees with a current instruction value, and shift to the third mode in response to a fact that the first current detector becomes the current instruction value;
during the third mode, perform voltage feedback control for the inverter so that the detection value of the first voltage detector agrees with a voltage instruction value, perform current feedforward control for the inverter so as to gradually increase the output current of the inverter to the load current that is a detection value of the second current detector, and shift to the fourth mode in response to a fact that the output current of the inverter becomes the load current; and
during the fourth mode, perform voltage feedback control for the inverter so that the detection value of the first voltage detector agrees with a voltage instruction value, and perform current feedforward control for the inverter in accordance with the detection value of the second current detector.

2. The uninterruptible power supply according to claim 1, wherein the AC filter includes:
a reactor having one terminal configured to receive the output voltage of the inverter, and having the other terminal connected to the one terminal of the first switch; and
a capacitor connected to the one terminal of the first switch.

3. The uninterruptible power supply according to claim 1, further comprising a second voltage detector configured to detect an instantaneous value of an AC voltage at the second terminal, wherein the controller is further configured to generate the voltage instruction value based on a detection value of the second voltage detector.

* * * * *